United States Patent
Nakakura et al.

(10) Patent No.: US 7,273,083 B2
(45) Date of Patent: Sep. 25, 2007

(54) PNEUMATIC TIRE USING CARCASS PLY

(75) Inventors: Kenji Nakakura, Osaka (JP); Kietsu Maeda, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 11/352,530

(22) Filed: Feb. 13, 2006

(65) Prior Publication Data

US 2006/0124222 A1    Jun. 15, 2006

Related U.S. Application Data

(62) Division of application No. 10/991,555, filed on Nov. 18, 2004, now Pat. No. 7,082,977, which is a division of application No. 09/965,054, filed on Sep. 26, 2001, now Pat. No. 6,849,146.

(30) Foreign Application Priority Data

| Oct. 25, 2000 | (JP) | ............................. 2000-325824 |
| Nov. 14, 2000 | (JP) | ............................. 2000-346456 |
| Mar. 15, 2001 | (JP) | ............................. 2001-074298 |

(51) Int. Cl.
*B60C 9/07*     (2006.01)

(52) U.S. Cl. ..................................... 152/562

(58) Field of Classification Search ................. 152/562
See application file for complete search history.

(56) References Cited

U.S. PATENT DOCUMENTS

| 1,461,984 | A | * | 7/1923 | Pfeiffer ........................ 152/562 |
| 2,930,425 | A |   | 3/1960 | Lugli et al. |
| 3,002,874 | A |   | 10/1961 | Lowe |
| 3,063,491 | A |   | 11/1962 | Mitchell |
| 3,082,140 | A |   | 3/1963 | Vanzo |
| 3,183,134 | A |   | 5/1965 | Frisby |
| 3,275,056 | A | * | 9/1966 | Menell .................... 152/562 X |
| 3,605,849 | A | * | 9/1971 | Boileau ................... 152/562 X |
| 3,802,982 | A |   | 4/1974 | Alderfer |
| 3,815,652 | A | * | 6/1974 | Pouilloux .................... 152/542 |
| 4,280,547 | A | * | 7/1981 | Gilmore ...................... 152/528 |
| 5,395,476 | A |   | 3/1995 | Debroche et al. |

FOREIGN PATENT DOCUMENTS

| JP | 61-263805 | 11/1986 |
| JP | 8-207509 | 8/1996 |
| JP | 2000-52448 | 2/2000 |

OTHER PUBLICATIONS

English translation of JP 61-263805 A.

* cited by examiner

*Primary Examiner*—Adrienne C. Johnstone
(74) *Attorney, Agent, or Firm*—Knobbe Martens Olson & Bear, LLP

(57) ABSTRACT

A pneumatic tire has two or more carcass layers for reinforcing between a pair of annular beads. The pneumatic tire includes: (i) a region including or near a position having a tire maximum width, which region includes a radial region where cords constituting the carcass layers are arranged at an angle of 90±10° with respect to a circumferential direction; (ii) a region between the radial region and one of the beads close thereto, which region includes a bias region where cords in an upper layer and cords in a lower layer constituting the carcass intersect and are both arranged at an angle of 10° to 60° with respect to the circumferential direction; and (iii) a region between the radial region and a tire equator line, which region includes another bias region.

6 Claims, 11 Drawing Sheets

(a)

8a (b)

8b (a)

(b)

(a)

8a (b)

8b

PNEUMATIC TIRE USING CARCASS PLY

CROSS-REFERENCE TO RELATED APPLICATION

This is a divisional of U.S. application Ser. No. 10/991,555 filed on Nov. 18, 2004, now U.S. Pat. No. 7,082,977, which is a divisional of U.S. application Ser. No. 09/965,054 filed on Sep. 26, 2001, now U.S. Pat. No. 6,849,146, which claims priority to Japanese Patent Application No. 2000-325824, filed Oct. 25, 2000, No. 2000-346456, filed Nov. 14, 2000, and No. 2001-74298, field Mar. 15, 2001, and the disclosure of which is hereby incorporated by this reference in its entirety.

BACKGROUND OF THE INVENTION

1. Field of the Invention

The present invention relates to a carcass ply producing apparatus for producing a carcass ply layer of a tire, a carcass ply producing method using this apparatus, and a pneumatic tire incorporating the carcass ply layer produced by this apparatus.

2. Description of the Related Art

Currently, a radial tire which is mainstream of a pneumatic tire generally comprises a carcass layer in which a portion between a pair of annular beads is reinforced and a plurality of cords are arranged in a radial direction of the tire (a meridional direction), and a plurality of belt layers in which the carcass layer located below a tread is reinforced by hoop effect, and the cords include a plurality of belt layers which are inclined in a circumferential direction of the tire. Rigidity of the carcass layer is large in the radial direction of the tire, but relatively small in the circumferential direction while the rigidity of the belt layer is large in the circumferential direction of the tire, but relatively small in the radial direction.

Therefore, a local stress can be generated in a belt end in the vicinity of a boundary between the carcass layer and the belt layer, which lowers durability of the tire. When the vehicle corners, it is known that a reaction force is abruptly reduced if the vehicle reaches a slip limit, and it is not possible to drive the vehicle in some cases.

On the other hand, in the case of bias tires, which existed prior to the manufacture of radial tires, rigidity of the tread is insufficient and has no cornering reaction force and, thus, motion is inferior. Further, it is known that shearing distortion is generated in the tire side wall due to flexing wherein the cords intersect each other, and that portion is prone to become fatigued and destroyed.

As a carcass ply producing apparatus for forming the carcass layer, there is a sticking apparatus of a carcass cord disclosed in Japanese Patent Application Laid-open No. 2000-52448 (prior art 1). This is an apparatus in which a core which is formed into a doughnut-like shape as a whole is driven in the circumferential direction, and carcass cord (ply cord) sent from a string-guide is extended in the meridional direction of the core and stuck on an outer peripheral surface.

This apparatus includes a swinging sending-out mechanism which reciprocates the string-guide provided on a tip end of the arm in the meridional direction of the core along the outer peripheral surface.

Japanese Patent Application Laid-open No. H.8-207509 (prior art 2) discloses a producing method of a pneumatic tire. According to this method, a rubber tape continuously reciprocates in its widthwise direction in a zigzag manner on a forming drum, bent at a widthwise end of the forming drum and wound around the forming drum, thereby forming a cylindrical body (carcass ply).

Further, Japanese Patent Application Laid-open No. S61-263805 (prior art 3) discloses a method in which a carcass ply comprising a plurality of cords arranged straightly is stuck on a forming drum having a plurality of cylindrical drums and then, the cylindrical drums are inclined through a predetermined angle, thereby partially changing the cord angle of the carcass ply. Outer peripheries of opposite side drums are pushed by the bands. This prior art 3 discloses a pneumatic tire in which a cord of a carcass layer located below a tread is largely inclined from a meridional direction, two carcass layers in which cords located on a tire side are radially arranged are laminated such that the inclined cords intersect with each other, and a reinforcing layer in which cords are arranged in its circumferential direction is provided on the outer peripheral surface of the layer.

In the case of the apparatus disclosed in the prior art 1, however, the string-guide only reciprocates along the meridional direction of the core. Therefore, when the ply cord is supplied in the meridional direction, a disposition angle of the ply cord can not changed halfway.

In the case of the carcass ply produced by the prior art 2, although the disposition angle of the ply cord is inclined, the disposition angle can not be changed halfway in the widthwise direction.

Whereas, in the case of the prior art 3, the disposition angle of the ply cord can be changed halfway in the widthwise direction. However, since the outer peripheries of the opposite side drums are pushed by the bands, there is a drawback that a curvature of the bent portion whose cord angle is changed is prone to become smaller. As disclosed in the prior art 3, even according to a method to apply tension at the time of vulcanization formation to soften the curve, if flattening becomes smaller to some degree, since the angle variation from the side to the tread is abrupt, it is difficult to soften the curvature of the bent portion. Therefore, a predetermined cord angle can not be realized using the prior art 3.

If the radius of curvature of the bent portion becomes small, there is a problem that a great shearing force is generated between the layers of the upper layer bent portion and the lower layer bent portion of the carcass layer of the double layered structure and thus, the bent portion is prone to be fatigued and may be destroyed. Further, since the bent portion is discontinuously changed in cord angle, there are problems that predictability of the slip limit at the time of cornering is low and improvement in safety is small like the radial tire.

In the prior art 3, since the outer peripheries of the opposite side drums are pushed by the band, there is a problem that surplus steps are required, which complicates the producing step of the carcass ply. There is also a problem that a region of the drum pushed by the band can not be changed in cord angle.

The present assignee newly developed a producing method of a ply for a carcass for forming a carcass layer in which the inclination angle of cord is changed in ever portion of the tire (this is unknown before the priority data of the present application). According to this method, even if flattening is small in some degree, carcass layer having small variation in cord angle can be formed. However, the following new problem is caused. That is, if the flattening is small, a width of the tread is relatively wide and thus, if the rigidity of the reinforcing layer in its circumferential direction provided on an outer periphery of the carcass layer is not increased, it is difficult to keep a predetermined shape of the tread of the tire, which lowers the running performance.

SUMMARY OF THE INVENTION

It is an object of the present invention to provide a carcass ply producing apparatus and a carcass ply producing method wherein the disposition angle of a ply cord can be changed halfway along its widthwise direction at a predetermined bending angle.

It is another object of the invention to provide a pneumatic tire capable of keeping a predetermined shape in a tire having flattening of 70% or less, and capable of enhancing the predictability of cornering to improve safety, and having durability higher than that of a conventional tire.

To achieve the above objects, the present invention provides a carcass ply producing apparatus for producing a carcass ply layer of a tire comprising a supply head for supplying one or a plurality of ply cords, a head driving mechanism for reciprocating the supply head along a widthwise direction of the carcass ply, a sticking body having a sticking surface to which the ply cord supplied by the supply head is stuck, a sticking body driving mechanism for moving the sticking surface of the sticking body along a longitudinal direction of the carcass ply, and a moving amount controlling mechanism capable of controlling a moving amount of the sticking surface with respect to a moving amount of the supply head, wherein when the ply cord is supplied along the widthwise direction of the carcass ply, a disposition angle of the ply cord with respect to the longitudinal direction can be changed.

Working effects of the carcass ply producing apparatus having the above structure is as follows:

(1) One or a plurality of ply cords are supplied to a sticking surface of a sticking body by a supply head.
(2) The supply head reciprocates along a widthwise direction of the carcass ply, which corresponds to the meridional direction of the tire.
(3) The sticking surface can move along the longitudinal direction of the carcass ply, which corresponds to the circumferential direction of the tire.
(4) A moving amount of the sticking surface can be controlled with respect to the supply head.

For example, as described later, when a carcass layer (carcass ply) of a tire having a new structure, while the supply head is moving along the widthwise direction, the moving amount of the sticking surface may be controlled in association with this movement. To control the moving amount of the sticking surface, the moving speed is changed halfway. With this control, the disposition angle of the carcass cord can easily be changed.

As described above, the carcass ply producing apparatus in which the disposition angle of the ply cord could be changed halfway in the widthwise direction of the carcass ply, and a predetermined bending angle could be realized could be provided.

In a preferred embodiment of the present invention, the sticking body is a rotation drum having an outer peripheral surface to which the ply cord is stuck.

With this structure, the ply cord is stuck on the outer peripheral surface of the rotation drum. To change the disposition angle of the ply cord halfway, rotation amount (or rotation speed) of the rotation drum is controlled.

In another preferred embodiment of the invention, the sticking body is a flat-plate like tray having a surface to which the ply cord is stuck.

With this structure, the ply cord is stuck on the surface of the flat-plate like tray. To change the disposition angle of the ply cord halfway, straight moving amount (or moving speed) of the flat-plate like tray is controlled.

In another preferred embodiment of the invention, the sticking body is a transfer conveyer having a transfer surface to which the ply cord is stuck.

With this structure, the ply cord is stuck on the surface of the transfer conveyer. To change the disposition angle of the ply cord halfway, transfer amount (or transfer speed) of the transfer conveyer is controlled. By using the transfer conveyer, the carcass plies can continuously be produced.

To achieve the above objects of the present invention, there is provided a carcass ply producing method for producing a carcass ply layer of a tire comprising a step for supplying one or a plurality of ply cords by a supply head, a step for reciprocating the supply head along a widthwise direction of the carcass ply, a step for sticking the ply cord supplied by the supply head to a sticking body having a sticking surface, a step for moving the sticking surface of the sticking body along a longitudinal direction of the carcass ply, and a step for controlling a moving amount of the sticking surface with respect to a moving amount of the supply head, wherein in the step for reciprocating the supply head, a disposition angle of the ply cord with respect to the longitudinal direction can be changed.

The working effect of the producing method of this structure is the same as the above (1) to (4). With this, the carcass ply producing method in which the disposition angle of the ply cord could be changed halfway in the widthwise direction of the carcass ply, and a predetermined bending angle could be realized could be provided.

The present invention also provides a pneumatic tire having two or more carcass layers for reinforcing between a pair of annular beads, and a reinforcing layer having a cord arranged on an outer peripheral surface of the carcass layer below a tread surface in a circumferential direction of a tire, and a flattening of the pneumatic tire being 70% or less, wherein the cord constituting the carcass layers are arranged substantially in a radial direction in a region of the tire from the bead to a position near a tire maximum width, and from that position to a grounding end, an angle with respect to a circumferential direction of the tire is gradually changed, and the angle is 20 to 60° with respect to the circumferential direction of the tire in the vicinity of the grounding end, and the angle is 20 to 50° at the tread surface. The carcass layers are laminated at an angle substantially symmetrical with respect to a tire equator line and a tensile modulus per unit width of the reinforcing layer is 1.2 times or more of the carcass layers.

Here, the tread surface is a range of inner side of grounding end of each of opposite sides of the tire. A criterion of the tensile modulus per unit width of the reinforcing layer is the entire width of the reinforcing layer, and a criterion of the tensile modulus per unit width of the carcass layer is the tread surface, apparent Young's modulus of the cord is measured in accordance with initial tensile resistance of JIS L-1017 chemical textile tire cord testing method, the number of cord strikes per unit width and a value obtained by multiplying the cord area of cross section by the number of layers are defined as the tensile modulus. A criterion of the number of strikes is a cured tire, but the number of strikes when material is prepared can be set from inflate rate at the time of forming.

The working effect of the pneumatic tire of this structure is as follows.

According to the pneumatic tire of the invention, the cord angle with respect to the tire circumferential direction from the tire maximum width to the grounding end is gradually changed. Therefore, a reinforcing effect is continuous. Thus, predictability of the cornering is high, and safety is enhanced. There is no bent portion in which the cord angle is changed discontinuously, and since the cord is disposed substantially in the radial direction of the tire from the bead to the tire maximum width, peeling off phenomenon between the two layers is less prone to be generated, and stress is less prone to be concentrated. Further, not only in the tread surface, but also in the outside shoulder portion, the cords intersect at a small angle to enhance the rigidity in the circumferential direction and thus, kinetic ability of cornering is enhanced. Since the tensile modulus per unit width of the reinforcing layer is 1.2 times or more of the carcass layer, a predetermined shape of the tread surface can be obtained even if the flattening is small. Further, the rigidity in the circumferential direction is enhanced by the reinforcing layer, and rigidity in the lateral direction is also enhanced by the carcass layer in which the cords intersect. Therefore, it is possible to enhance both the kinetic ability of cornering and safety. As a result, it is possible to provide a pneumatic tire in which a predetermined shape can be held in a tire having flattening of 70% or less, and the predictability of the cornering and safety are improved and durability is higher than that of the conventional tire.

In the above structure, it is preferable that the reinforcing layer includes a central portion having a width of 45 to 80% of entire width of the tread surface located at a center of and below the tread surface, and opposite sides having tensile modulus per unit width which is lower than that of the central portion. Here, a criterion of the tensile modulus per unit width of each portion of the reinforcing layer is the entire width of each portion.

In the case of this preferred embodiment, since the tensile modulus of the central portion of the reinforcing layer is enhanced as compared with the side, more desired shape can be held by reinforcing the central portion of the tread surface which is prone to swell with high rigidity.

It is preferable that the tensile modulus per unit width of the central portion is 1.2 times or more of a tensile modulus per unit width of the side.

In this case, a desired shape can be held more reliably.

The present invention also provides a pneumatic tire having two or more carcass layers for reinforcing between a pair of annular beads, wherein when a region where an angle formed between cords constituting the carcass layers and a circumferential direction of the tire is 90±10° is defined as a radial region, and a region where the cords in upper and lower layers intersect while an angle formed between the cords and the circumferential direction of the tire is 10 to 60° is defined as a bias region, a region including a position near a tire maximum width includes the radial region, and the bias region is included in any of a region between the radial region and the bead, and a region between the radial region and a tire equator line.

The working effect of the pneumatic tire of this structure produces various advantages.

For instance, since the radial region is included in the region including the position near the tire maximum width, riding comfort can be maintained excellently. Further, since the bias region is included on the side of the bead in that region, rigidity of the carcass layer can be enhanced near the bead, steering stability, driving and control abilities can be enhanced. Since the bias region is also included in the tread of the radial region, rigidity of the carcass layer near the shoulder and tread can be enhanced. As a result, merits of the radial tire and bias tire can properly be used finely in each portion of the tire, it is possible to provide a pneumatic tire in which riding comfort can be maintained excellently, the rigidity near the bead and the shoulder can be enhanced, and reinforcing structure in that portion is unnecessary or simplified.

In the above structure, it is preferable that a region having 5 to 30% of height from a lower end with respect to height of carcass of a tire cross section is mainly the bias region, a region of 40 to 65% is mainly the radial region, and a region of 75 to 95% is mainly the bias region. Here, mainly bias region means that 80% or more of the entire area of the designated region is the bias region. The same can be applied for the radial region. The carcass height of the tire cross section means that the lower end is the minimum diameter portion of the folded portion of the carcass layer, and the upper end is the maximum diameter portion near the tire equator line of the carcass layer (see Hc in FIG. 4).

In the case of this structure, the bias region and the radial region are disposed at preferred positions in this order, the above advantages can be obtained more reliably.

It is preferable that a region including the tire equator line further include the radial region reinforced by a belt layer, and the bias region is included in any of intermediate region between that radial region and the radial region near the tire maximum width.

In the case of this structure, the radial region reinforced by the belt layer exhibits high rigidity in both the circumferential direction and widthwise direction of the tire, and the bias regions on the opposite sides thereof exhibit appropriate rigidity. Thus, the continuity of the rigidity with respect to the radial region near the tire maximum width can be kept. As a result, during the cornering, it is possible to enhance the predictability of the slip limit.

At that time, it is preferable that a region having 5 to 30% of height from a lower end with respect to height of carcass of a tire cross section is mainly the bias region, a region of 40 to 65% is mainly the radial region, a region of 75 to 95% is mainly the bias region, and a tread is mainly the radial region.

In this case, the bias region, the radial region, the bias region and the radial region are disposed at preferred positions in this order, the above advantages can be obtained more reliably.

DETAILED DESCRIPTION OF THE PREFERRED EMBODIMENT

Figure 1:
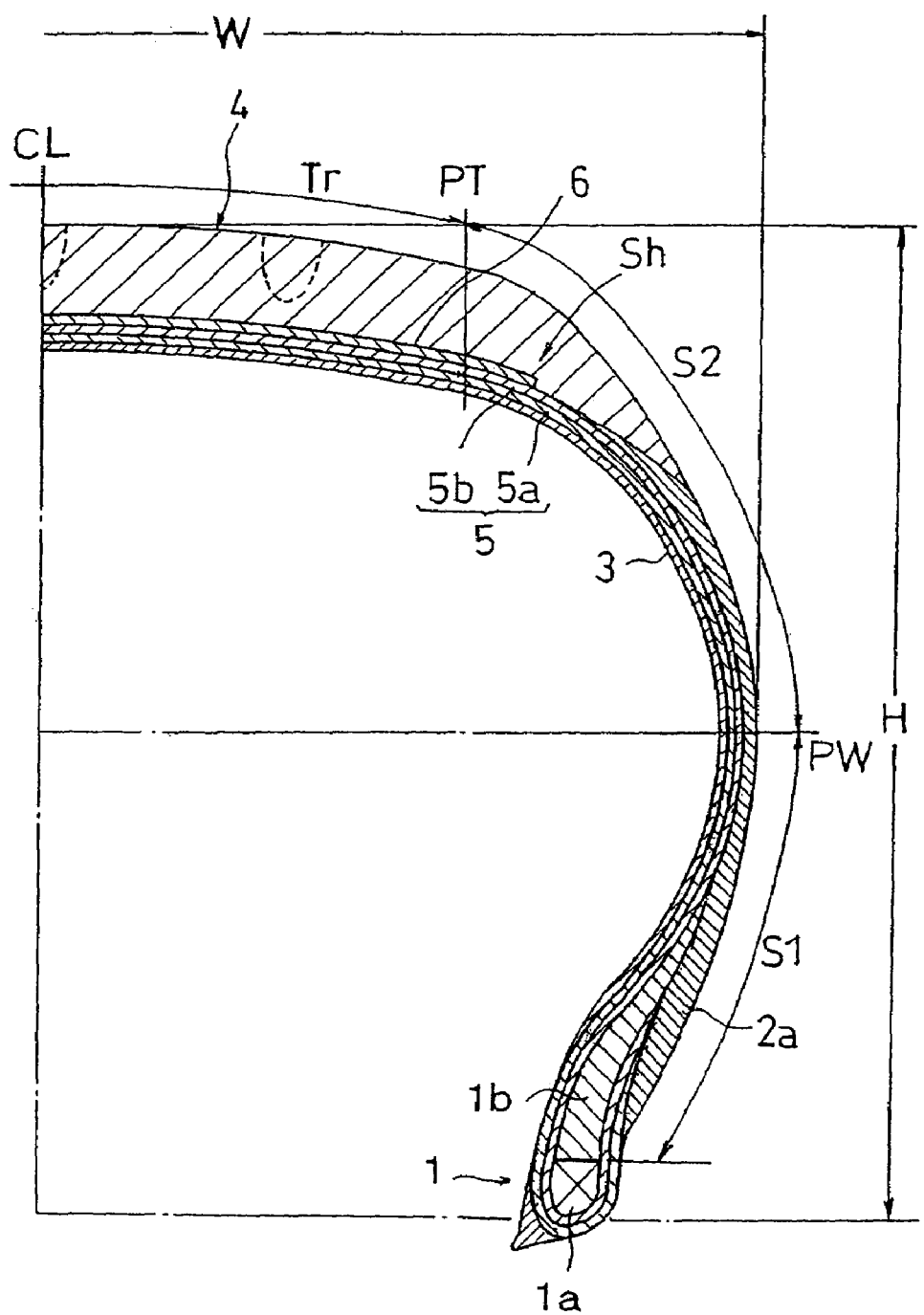
FIG. 1 is a partial sectional view showing a pneumatic tire according to a first embodiment.

Preferred embodiments of a carcass ply producing apparatus and a pneumatic tire of the present invention will be explained using the drawings. First, a pneumatic tire constituting a carcass layer produced by the carcass ply producing apparatus will be explained. FIG. 1 is a partial sectional view showing a pneumatic tire according to a first embodiment. FIG. 2(a) is a front view of partially cut pneumatic tire, and FIG. 2(b) is a plan view thereof.

Structure of Pneumatic Tire (First Embodiment)

As shown in FIG. 1, the pneumatic tire comprises a carcass layer 5 having two or more layers for reinforcing between a pair of annular beads 1a, and a reinforcing layer 6 provided below a tread surface Tr on an outer peripheral surface of the carcass layer 5. This embodiment shows an example in which the carcass layer 5 comprises two layers.

As used herein, the term flattening is expressed as a percentage and is obtained by dividing a height H of cross section of the tire by a tire maximum width W. The flattening in the present invention is 70% or less. As the flattening is reduced to 65% or less or 60% or less, the present invention having the above effects becomes more effective. That is, it is possible to enhance the prediction of the cornering to improve the safety, and to enhance the cornering performance by flattening the tire.

Figure 2:
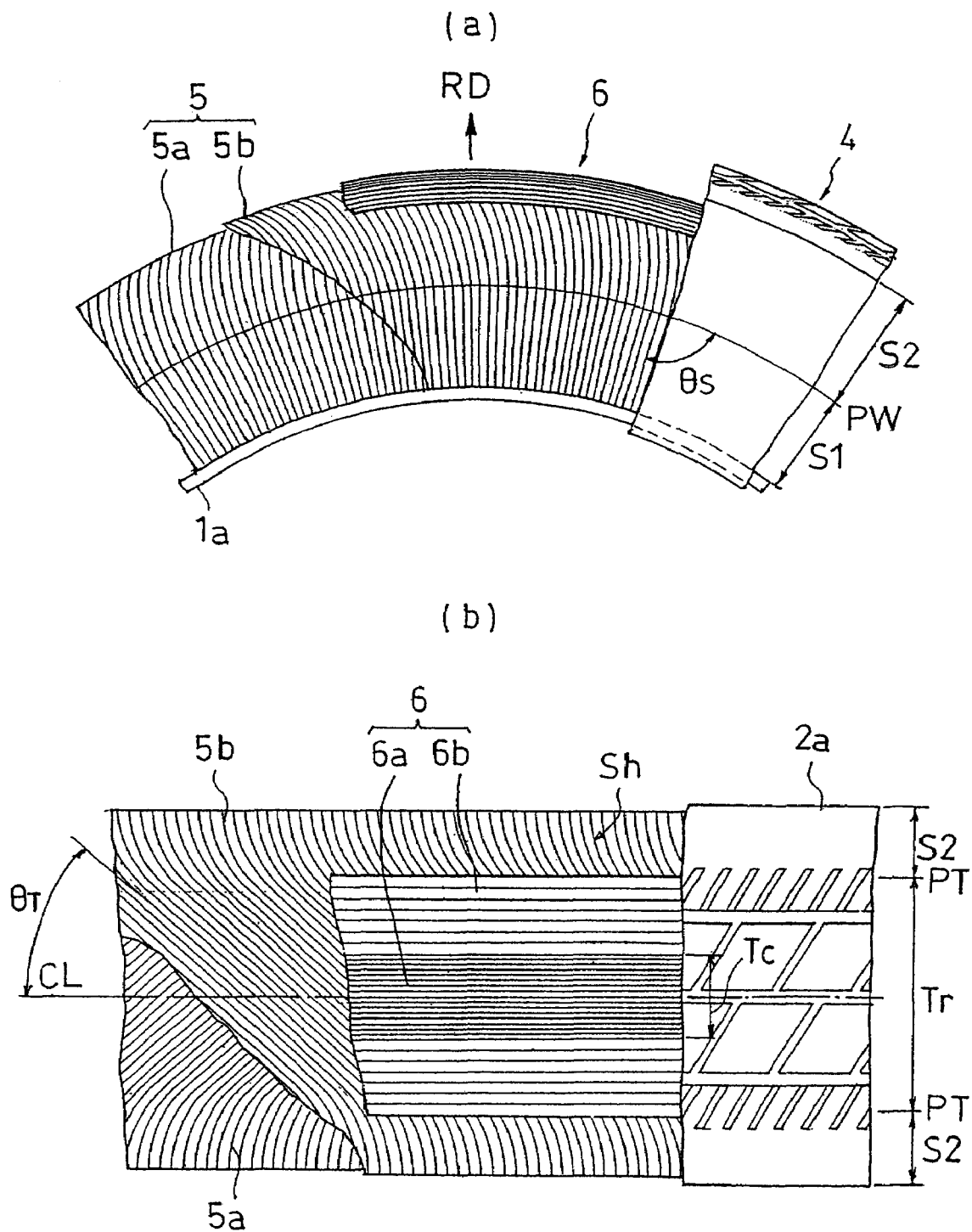
FIG. 2 are views showing essential portion of the pneumatic tire in FIG. 1, wherein (a) is a front view of partially cut pneumatic tire, and (b) is a plan view thereof.

As shown in FIG. 2, the present embodiment is characterized in that a cord constituting the carcass layer 5 is disposed at different angle depending upon a portion of the tire. More specifically, at a region S1 from a bead 1a to a position PW near a tire maximum width W, the cord is disposed substantially in a radial direction of the tire (e.g. θs=90°), at a region S2 from the position PW to a ground end PT, the angle (cord angle, hereinafter) with respect to a circumferential direction of the tire is gradually changed, at a shoulder portion Sh near the ground end PT, the cord angle is 20 to 60°, and at a tread surface Tr between opposite ground end PT, the cord angle is 20 to 50° (e.g., θt=35°). Preferably, the cord angle at the shoulder Sh is 20 to 50°, and the cord angle at the tread surface Tr is 20 to 40°.

If the cord angle at the tread surface Tr exceeds 50°, the carcass layer 5 at the tread surface Tr is prone to be extended in the radial direction RD of the tire and it is difficult to maintain its shape. If the cord angle at the treat Tr becomes smaller than 20°, although the rigidity in the circumferential direction at the treat Tr is increased, rigidity in its widthwise direction becomes small and thus, the cornering performance is deteriorated, and it is difficult to gradually varying the angle from the ground end PT to the bead 1.

The lower layer carcass layer 5a and an upper layer carcass layer 5b are laminated such that the cords are disposed at substantially symmetrical angle with respect to a tire equator line CL. Opposite ends of the carcass layer 5 are folded back outward at a bead 1a, a bead filler 1b having high rubber hardness is disposed between the folded portion and a body of the carcass layer 5, and a bead 1 is formed. Like a common tire, a side wall rubber 2a, an inner liner rubber 3, a tread rubber 4 and the like are disposed on outer side of the carcass layer 5. Predetermined patterns are formed on an outer peripheral surface of the tread rubber 4.

A reinforcing layer 6 comprises cords that are arranged in a tire circumferential direction (i.e., direction which is parallel to the tire equator line CL). The reinforcing layer 6 is disposed at a position below the tread surface Tr of the outer peripheral surface of the outermost carcass layer 5b. It is unnecessary that the reinforcing layer 6 coincides with a width of the tread surface Tr, and usually has a width in a range exceeding a width of the tread surface Tr. More specifically, it is preferable that the width of the reinforcing layer 6 be 1.0 to 1.3 times of the width of the tread surface Tr.

Tensile modulus per entire width of the reinforcing layer 6 is 1.2 times or more of tensile modulus (sum of all the layers) of the carcass layer 5 of the treat Tr, and is preferably 1.5 to 6 times. If the tensile modulus exceeds 6 times, the tire is inferior in terms of processing aspect or producing aspect. The tensile modulus per unit width of the reinforcing layer 6 can be adjusted by the number of strike of the cord, the cord thickness and material of the cord, and processing condition of the fiber. The same is applied to the carcass layer 5 also.

Examples of cord material constituting the carcass layer 5 include organic fibers such as polyester, polyamide and polyaramide or steel and the like. Examples of cord material constituting the reinforcing layer 6 also include organic fiber such as polyester, polyamide and polyaramide or steel and the like. In the present invention, since it is unnecessary to provide a plurality of belt layers unlike the conventional radial tire, weight of the tire can be lowered. Further, since the reinforcing layer 6 reinforces the biased carcass layer 5, bending rigidity of that portion is enhanced and thus, the cord of the reinforcing layer 6 can be constituted by an organic fiber to further reduce the weight. It is possible to enhance both the cornering performance and safety.

Preferably, the reinforcing layer 6 is provided at its central position below the tread surface Tr with a central portion 6a disposed in a range Tc of 45 to 80% of the entire width of the tread surface Tr, and opposite side portions 6b having lower tensile modulus per unit width of the central portion 6a. In this embodiment the number of strikes of the central portion 6a is greater than that of the side portions 6b. The reinforcing layer 6 is usually formed in such a manner that after shaping, a ribbon-like reinforcing layer comprising one or small number of cords are spirally wound so as to remove cut portions of the cords. It is possible to increase the number of strikes of the central portion 6a by changing the winding pitch.

In the present invention, it is preferable that the tensile modulus per unit width of the central portion 6a is 1.2 time or more of the tensile modulus per unit width of the side portion 6b. More preferably, the tensile modules per unit width of a portion from a center (position on the tire equator line CL) of the reinforcing layer 6 to the opposite ends is gradually reduced. This can be done also by gradually increasing the winding pitch.

Figure 3:
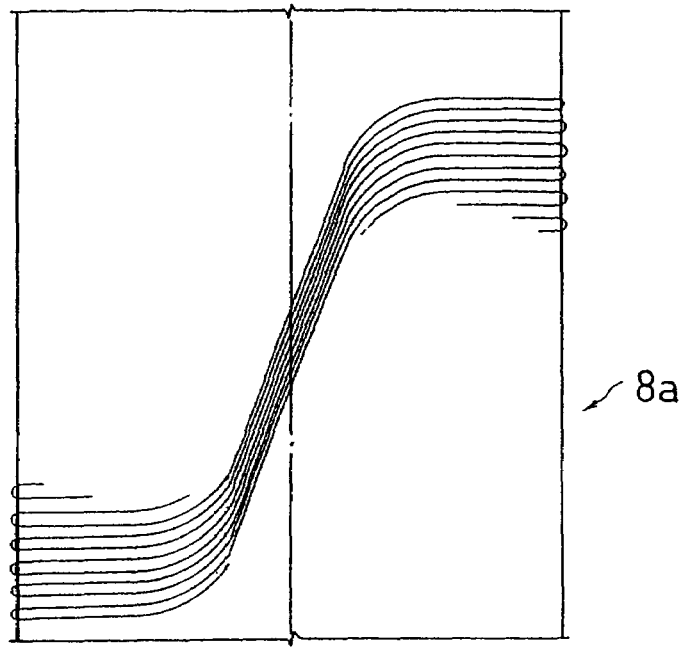
FIG. 3 shows one example of a carcass ply, wherein (a) is a plan view of a lower layer ply, and (b) is a plan view of an upper layer ply.
Figure 3:
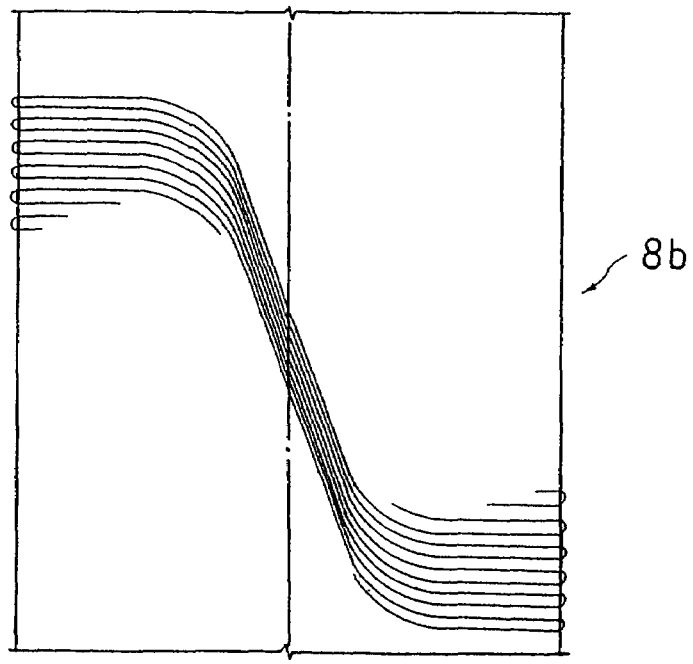

The pneumatic tire of the present invention can be produced in the same manner as that of a common pneumatic tire except that carcass plies 8a and 8b in which cord angle is partially changed to a position in the widthwise direction are used as shown in FIG. 3. The carcass plies 8a and 8b are laminated cylindrically so that cords are disposed substantially symmetrically with respect to the center line, a bead is disposed for example and then, a turn up bladder is inserted, the tire is shaped into toroidal shape and then, the reinforcing layer 6 and the tread are formed.

Modification of First Embodiment (1) In the first embodiment, two carcass layers are provided. The number of the layers may be even number such as four. In such a case, it is preferable that the pair of carcass layers are laminated such that the cords are disposed at substantially symmetrical angle with respect to a tire equator line, and the cords of the carcass layers laminated in the same direction are disposed in the same direction at their positions.

(2) In the first embodiment, one reinforcing layer in the circumferential direction is provided, and the tensile modulus per unit width is enhanced by changing the number of strikes at the central portion. Alternatively, the tensile modulus per unit width may be enhanced by providing two reinforcing layers of central portion. Two or more reinforcing layers may be provided.

Structure of Pneumatic Tire (Second Embodiment)

Figure 4:
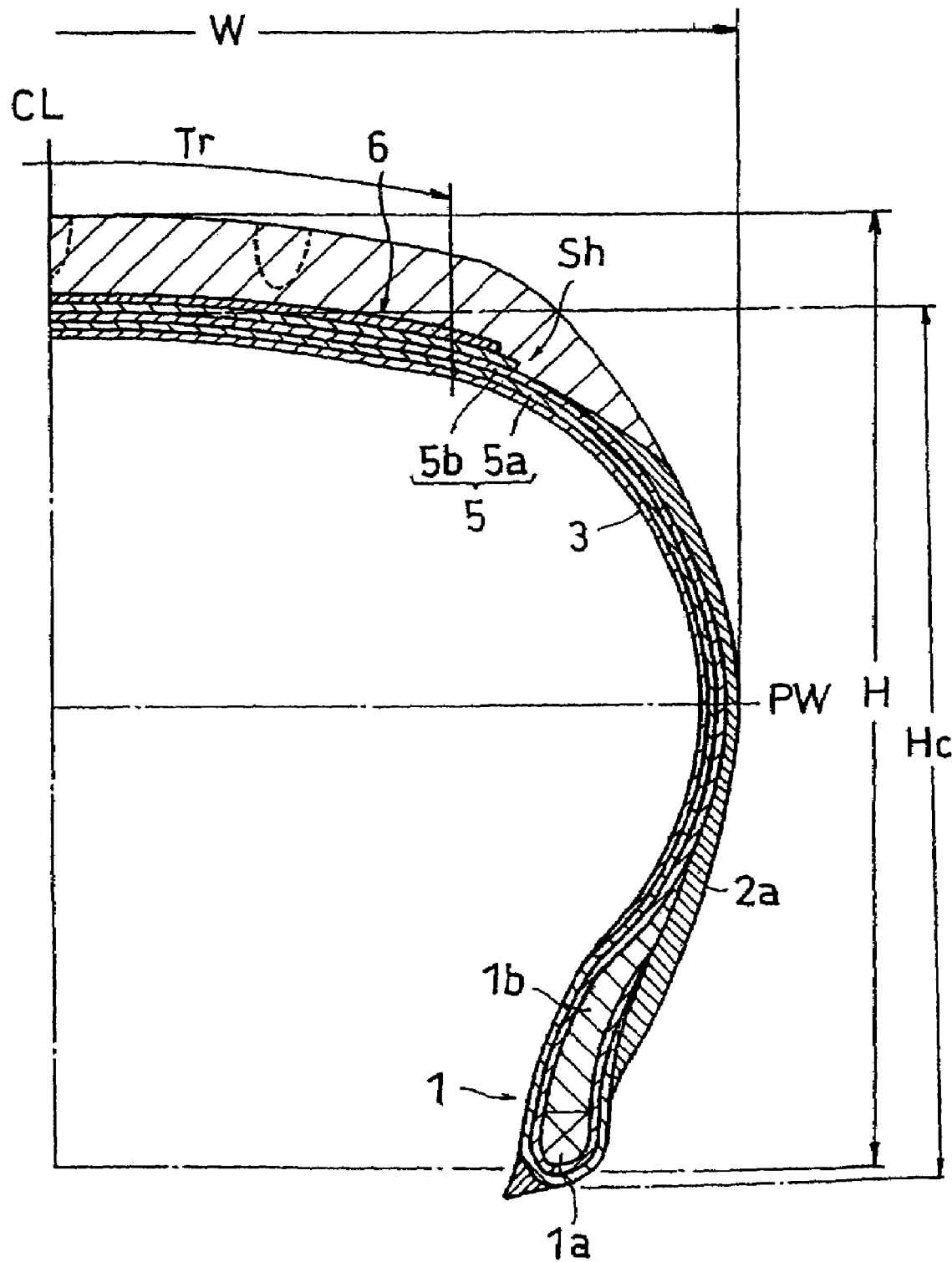
FIG. 4 is a partial sectional view showing a pneumatic tire according to a second embodiment.
Figure 5:
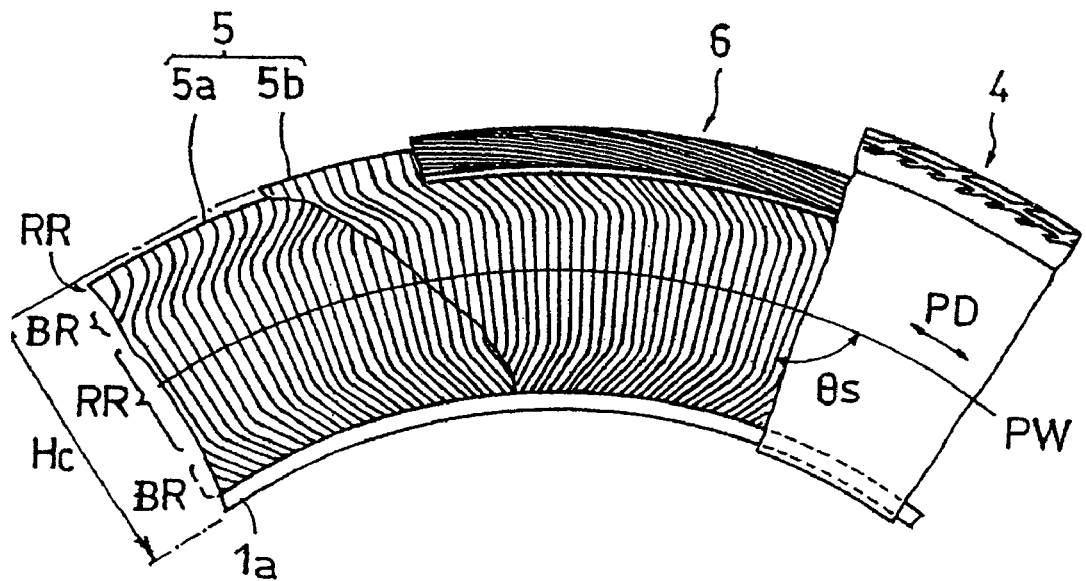
FIG. 5 are views showing essential portion of the pneumatic tire in FIG. 4, wherein (a) is a front view of partially cut pneumatic tire, and (b) is a plan view thereof.
Figure 5:
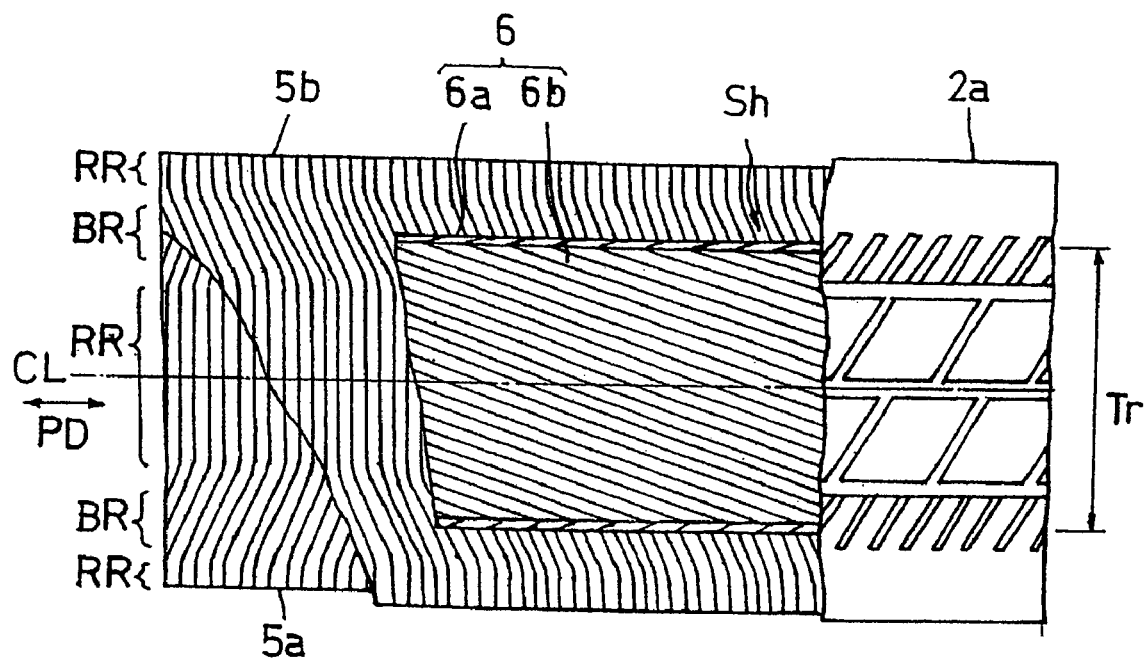

As shown in FIGS. 4 and 5, a pneumatic tire of the second embodiment includes two or more carcass layers 5 for reinforcing between a pair of annular beads 1a. In this embodiment, the carcass layer 5 comprises an upper layer 5b and a lower layer 5a. In this invention, a region in which an angle θs formed between a cord constituting the carcass layer and a tire circumferential direction PD is 90±10° is defined as a radial region RR, and a region in which the cords of the upper and lower layers intersect with each other when the angle θs ("cord angle" in some cases hereinafter) between the cord and the tire circumferential direction PD is 10 to 60° (absolute value) is defined as a bias region BR. The cord angle θs of each of the upper and lower layers may be slightly varied at the intersection.

As shown in FIG. 5, the present invention is characterized in that a region including a position near the tire maximum width position PW includes the radial region RR, any of region between the radial region RR and the bead 1a, and any region between the radial region RR and the tire equator line CL includes the bias region BR. In this embodiment, a region including the tire equator line CL further includes a radial region RR reinforced by a belt layer 6, and any region located intermediate portion between the radial region RR and another radial region near the tire maximum width PW includes the bias region BR.

More specifically, it is preferable that a region in which a height ratio of the tire cross section with respect to carcass height Hc from the lower end is 5 to 30% is the bias region BR, a region of 40 to 65% is mainly a radial region RR, a region of 75 to 95% is mainly the bias region BR, and the tread surface Tr is mainly the radial region RR. It is preferable that an intermediate region which corresponds nothing is provided between the radial region RR and the bias region BR so that the cord angle θs is gently changed.

At that time, it is preferable that a region in which a height ratio of the tire cross section with respect to carcass height Hc from the lower end is 75 to 95% corresponds to the shoulder portion Sh, and the bias region BR is disposed in this portion. If an end side of a layer having the maximum width (lower layer 6a in the illustrated example) among the plurality of belt layers 6 is disposed on this bias region BR, stress is less prone to be generated in the vicinity of the end of the belt layer 6 as compared with a case in which the end side is disposed on the radial region RR, and continuity of rigidity with respect to the radial region RR in the vicinity of the tire maximum width becomes excellent.

Although the upper layer 6b and the lower layer 6a constitute the belt layer 6 in this embodiment, it is preferable that the angle of the cord constituting each layer with respect to the tire equator line CL is 10 to 35°, and more preferably, 15 to 25°. A fiber reinforcing layer in which a cord is disposed in the circumferential direction may be provided on an upper surface of the upper layer 6b.

The belt layer 6 may comprise any of material used for conventional belt layer 6 such as steel or organic fiber including polyester. The cord material constituting the fiber reinforcing layer may comprise an organic fiber such as polyester, polyamide and polyaramide.

In order to enhance the rigidity in the vicinity of the bead 1a and to enhance the operation stability, driving and braking performance, it is preferable that the cord angle θs of the bias region BR disposed near the bead 1a is 10 to 60°, and more preferably, 20 to 50°. As a result, it is possible to reduce the bead filler and reinforcing ply around the bead.

In order to disperse the stress and to enhance the continuity of rigidity, it is preferable that the cord angle θs of the bias region BR disposed near the shoulder portion Sh is 10 to 60°, and more preferably, 20 to 50°. As a result, it is possible to reduce the reinforcing ply around the belt end.

The lower carcass layer 5a and the upper carcass layer 5b are laminated such that cords are disposed substantially symmetrically with respect to the tire equator line CL. The cord constituting the carcass layer 5 may comprise an organic fiber such as polyester, polyamide and polyaramide or steel and the like.

The pneumatic tire of the present invention has substantially the same structure as that of a usual radial tire except that the cord angle θs of the carcass layer 5 is partially changed. That is, as shown in FIG. 4, opposite ends of the carcass layer 5 are folded back outward at the bead 1a, a bead filler 1b having high rubber hardness is disposed between the folded portion and a body of the carcass layer 5, and a bead 1 is formed. Like a common tire, a side wall rubber 2a is disposed on outer side of the carcass layer 5, and an inner liner rubber 3 is disposed on inner side of the carcass layer 5, and a tread rubber 4 and the like are disposed on outer side of the belt layer 6. Predetermined patterns are formed on an outer peripheral surface of the tread rubber 4.

As mentioned above herein, the flattening in the present invention is 70% or less. As the flattening is reduced to 65% or less or 60% or less, it is possible to enhance the prediction of the cornering to improve the safety, and to enhance the cornering performance by flattening the tire.

Figure 6:
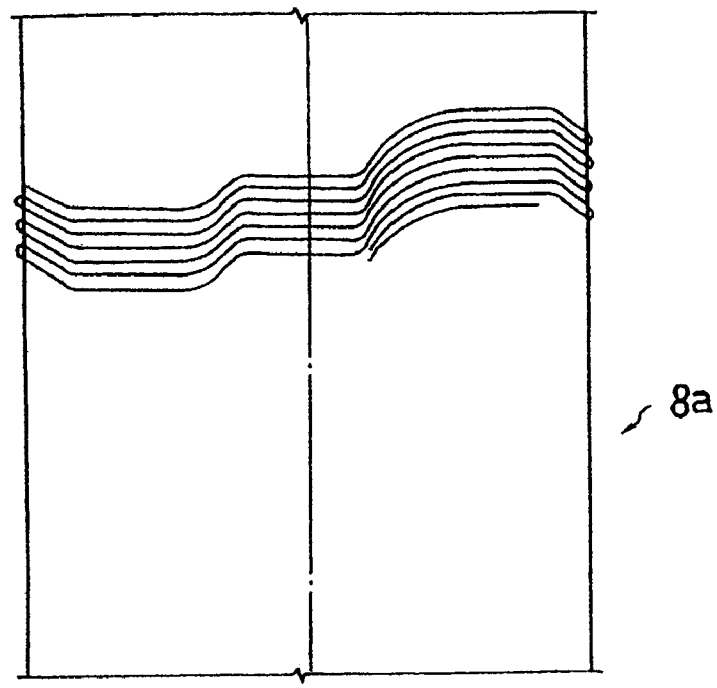
FIG. 6 shows one example of a carcass ply, wherein (a) is a plan view of a lower layer ply, and (b) is a plan view of an upper layer ply.
Figure 6:
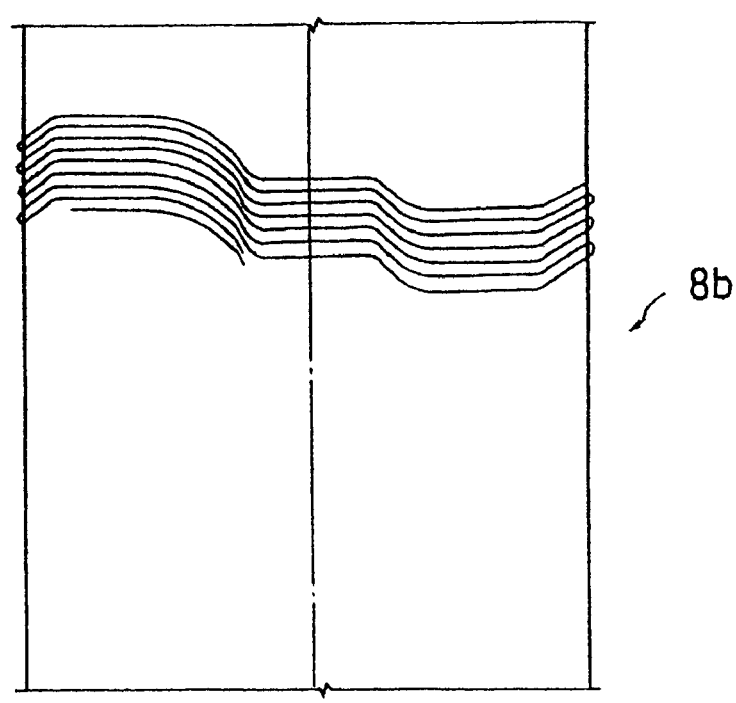

The pneumatic tire of the present invention can be produced in the same manner as that of a common pneumatic tire except that carcass plies 8a and 8b in which cord angle is partially changed to a position in the widthwise direction are used as shown in FIG. 6. The carcass plies 8a and 8b are laminated cylindrically so that cords are disposed substantially symmetrically with respect to the center line, a bead is disposed for example and then, a turn up bladder is inserted, the tire is shaped into toroidal shape and then, the belt layer 6 is formed by a normal method.

Modification of Second Embodiment (1) In the second embodiment, the bias region, the radial region, the bias region and the radial region are disposed in this order between the bead to the tire equator line. Alternatively, the bias region, the radial region and the bias region may be disposed in this order between the bead and the shoulder portion, and the bias region may be disposed also in the tread. At that time, it is preferable that a region in which a height ratio of the tire cross section with respect to carcass height Hc from the lower end is 5 to 30% is the bias region, a region of 40 to 65% is mainly a radial region, a region of 75 to 95% is mainly the bias region.

In the above case, it is preferable that the belt layer is not provided on the outer peripheral surface of the bias region of the tread, and a reinforcing layer in which the cord is arranged in the tire circumferential direction is provided. It is preferable that this reinforcing layer has tensile modulus per unit width of 1.2 time or more of that of the carcass layer. The reinforcing layer preferably includes a central portion disposed in a range of 45 to 80% of the entire tread surface in a central position below the tread surface, and opposite sides having tensile modulus per unit width lower than that of the central portion. The tensile modulus per unit width of the central portion is preferably 1.2 times or more of the tensile modulus per unit width of the side.

Here, the tread surface includes the inner side of grounding end on opposite sides of the tire. A criterion of the tensile modulus per unit width of the reinforcing layer is the entire width of the reinforcing layer, and a criterion of the tensile modulus per unit width of the carcass layer is the tread surface, apparent Young's modulus of the cord is measured in accordance with initial tensile resistance of JIS L-1017 chemical textile tire cord testing method, the number of cord strikes per unit width and a value obtained by multiplying the cord area of cross section by the number of layers are defined as the tensile modulus. A criterion of the number of strikes is a cured tire, but the number of strikes when material is prepared can be set from inflate rate at the time of forming.

Figure 7:
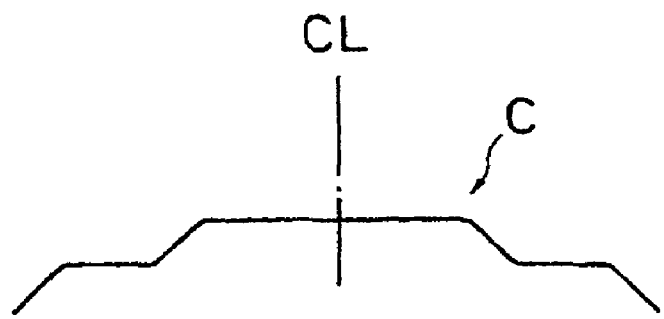
FIG. 7 is a plan view showing another cord arrangement of the carcass ply.
Figure 7:
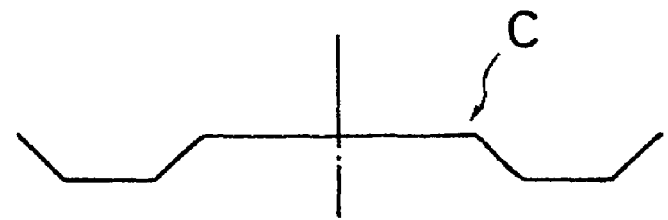
Figure 7:
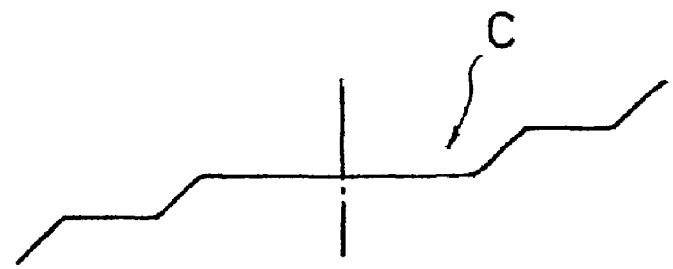
Figure 7:
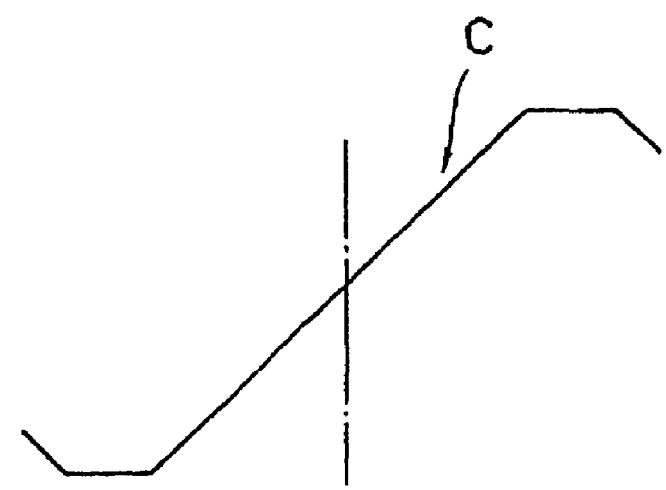

(2) In the second embodiment, the cords constituting the carcass layer are arranged as shown in FIG. 6, but they may be arranged variously as shown in FIG. 7. In FIG. 7, only one unit C of the cords of the carcass ply of each of the upper layer and lower layer is shown.

FIGS. 7A to 7B show a line symmetric arrangement with respect to the tire equator line CL. FIGS. 7C to 7D show a symmetric arrangement with respect to a point at the intersection between the cord and the tire equator line CL. In the above modification (1), for example, a carcass ply having cord arrangement shown in FIG. 7(d) can be used.

(3) In the second embodiment, two carcass layers are provided. The number of the layers may be even number such as four. In such a case also, it is preferable that the pair of carcass layers are laminated such that the cords are disposed at substantially symmetrical angle with respect to a tire equator line, and the cords of the carcass layers laminated in the same direction are disposed in the same direction at their positions.

(4) In the second embodiment, arrangement of the radial region and the bias region for the body portion of the carcass layer is explained. However, in the folded portion of the carcass layer, any of the radial region, the bias region and an intermediate region which corresponds nothing may be disposed. In the present invention, it is preferable that the bias region is disposed also in the folded portion of the carcass layer to further enhance the rigidity of the carcass layer near the bead.

At that time, the folded portion may be formed without changing the cord angle of the body of the carcass layer disposed near the bead (see FIG. 7), and only the carcass layer disposed around the bead (portion circumscribing the bead) may be set as the radial region. The preferable cord angle of the bias region in the folded portion is the same as the cord angle of the body.

Structure of Carcass Ply Producing Apparatus (First Embodiment)

Figure 8:
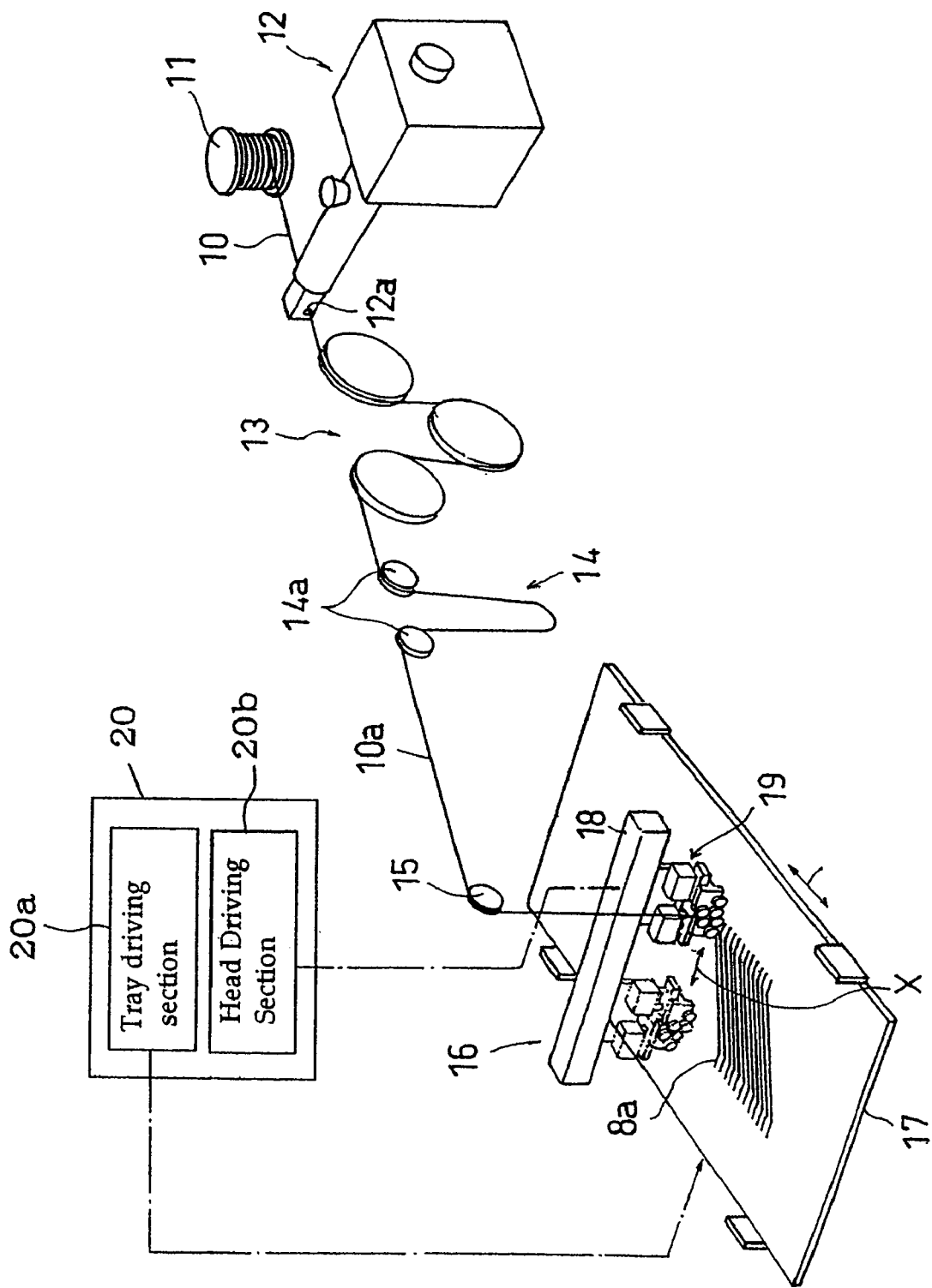
FIG. 8 shows a structure of a carcass ply producing apparatus according to the first embodiment.
Figure 9:
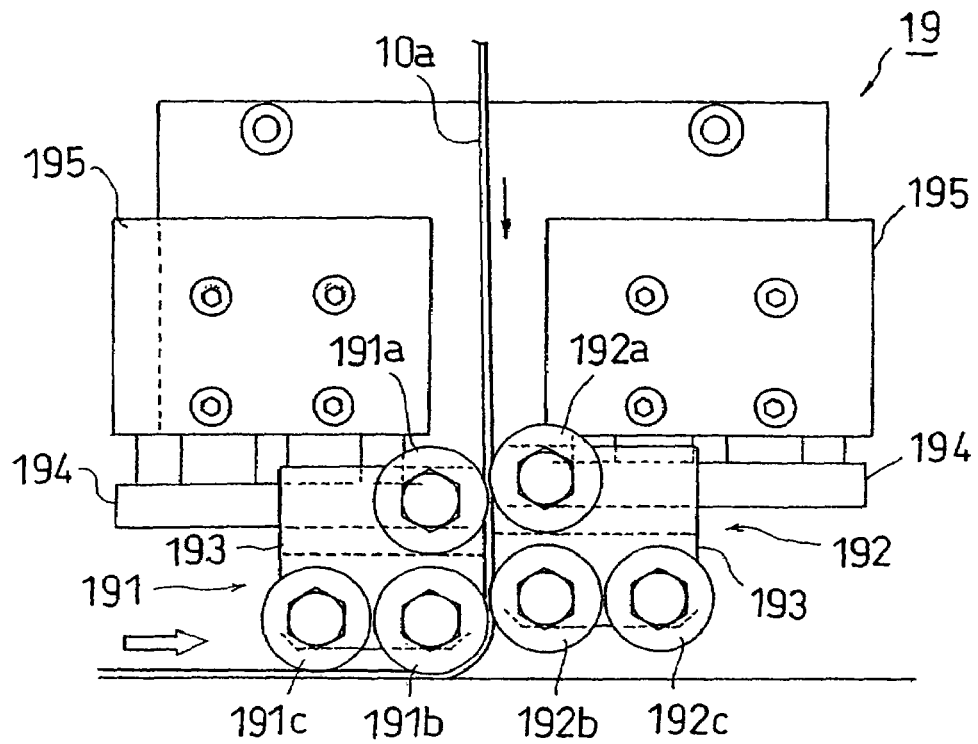
FIG. 9 is a front view of a supply head.

A structure of a first embodiment of a carcass ply producing apparatus for producing the carcass plies 8a and 8b shown in FIGS. 3 and 6 with reference to FIGS. 8 and 9.

As shown in FIG. 8, the carcass ply producing apparatus comprises a bobbin 11 around which a cord material 10 is wound, a covering rubber extrusion machine 12 for covering the cord material 10 sent from the bobbin 11 with covering rubber, roller group 13, a shock-absorbing portion 14 including shock-absorbing rollers 14a, a guide roller 15, a head driving mechanism 16 for supplying the a cord 10a (ply cord) along a widthwise direction of the carcass ply, and a flat-plate like tray 17 (corresponding to sticking body) to which the cord is stuck. A sticking surface of the tray 17 is formed of a material capable of sticking the cord such as rubber and aluminum. The apparatus further comprises a controlling apparatus 20 the carcass ply producing apparatus. The controlling apparatus 20 comprises a tray driving section 20a for driving the flat-plate like tray 17 and a head driving section 20b for driving a supply head 19. The head driving mechanism 16 includes the supply head 19 and a head guide section 18.

By allowing the cord material 10 sent from the bobbin 11 to pass through a base 12a of the covering rubber extrusion machine 12, uncured rubber is covered. The cord 10a covered with rubber is sent between the shock-absorbing rollers 14a of the shock-absorbing portion 14 and is loosened. This shock-absorbing portion 14 is provided for adjusting the processing speed before and after the above operation.

Figure 10:
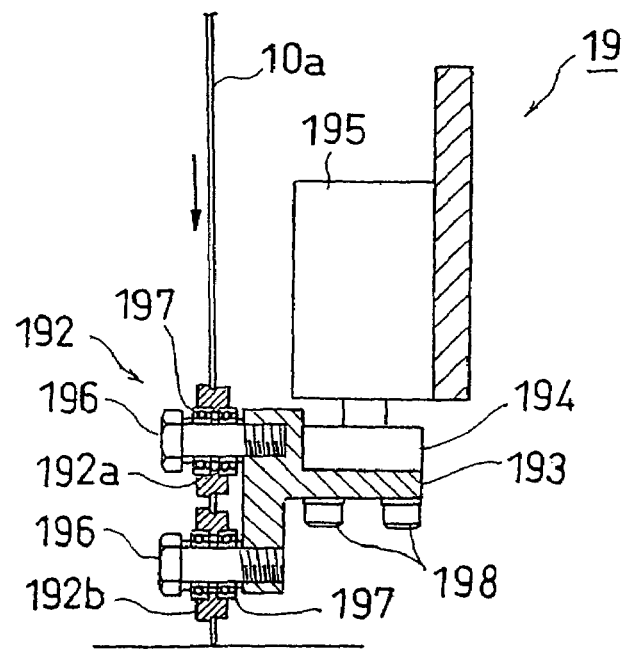
FIG. 10 is a side view of the supply head.

A tip end of the cord 10a covered with rubber is supplied along the widthwise direction (X direction: meridional direction of tire) of the carcass ply 8a by the supply head 19 of the head driving mechanism 16. Details of the supply head 19 are shown in FIGS. 9 and 10. FIG. 9 is a front view of the supply head 19, and FIG. 10 is a side view of the supply head.

The supply head 19 includes a first head section 191 and a second head section 192. The first head section 191 includes supply rollers 191a, 191b and a pressure roller 191c. Similarly, the second head section 192 includes supply rollers 192a, 192b and a pressure roller 192c. Although FIG. 10 shows only the side of the second head section 192, the rollers 192a, 192b, 192c are supported on a first supporting body 193 by a bearing 197 and a bolt 196. The first supporting body 193 is fixed to a second supporting body 194 by means of bolts 198. The second supporting body 194 can be driven vertically by a cylinder 195. The first head section 191 also has the same structure. A mechanism for vertically moving the second supporting body 194 may employ a motor or cam.

In FIG. 9, the cord 10a is supplied from above and travels downward. The cord 10a is sandwiched between the supply rollers 191a and 192a and the pressure rollers 191b and 192b and supplied, and stuck to the sticking surface of the tray 17 by the pressure rollers 191b and 192b. In FIG. 9, the supply head 19 is moving from left side to the right side. In this case, the cord 10a is pushed by the pressure rollers 191b and 191c on the side of the first head section 191, and the second head section 192 floats up from the sticking surface slightly.

On the other hand, when the supply head 19 moves from the right side to the left wide, the cord 10*a* is pushed by the pressure rollers 192*b* and 192*c* on the side of the second head section 192.

The supply head 19 can reciprocate along the head guide section 18, and for example, a known linear guide mechanism can be used. The tray 17 can also move along the longitudinal direction (Y direction: circumferential direction of the tire) of the carcass ply. A known linear guide mechanism can be used as a mechanism (corresponding to a sticking body driving mechanism) for moving the tray 17 in the Y direction.

The supply head 19 and the tray 17 are driven based on commands from the control apparatus 20 (corresponding to a moving amount control mechanism), but it is possible to control the moving amount of the tray 17 with respect to the moving amount of the supply head 19. This control is carried out based on a control program stored in the control apparatus 20. By carrying out such a control, when the cord 10*a* is supplied along the widthwise direction of the carcass ply, the disposition angle of the cord with respect to the longitudinal direction of the carcass ply can be changed.

For example, when the carcass ply as shown in FIG. 3 is produced, the tray 17 is controlled during forward movement of the supply head 19 in the following manner. It is assumed that the supply head 19 moves at a constant speed.

(1) right ply end~near tire maximum width: tray is stopped.
(2) near tire maximum width~right shoulder portion: tray moves while gently accelerating.
(3) right shoulder portion~left shoulder portion: tray moves at a constant speed.
(4) left shoulder portion~near tire maximum width: tray moves while gently decelerating.
(5) near tire maximum width~left ply end: tray is stopped.

During the forward movement of the supply head 19, the tray 17 is controlled in the above manner. During a backward movement of the supply head 19, the tray 17 is moved by a distance corresponding to the number of ply cords (in the example in FIG. 9, one ply cord because one cord is supplied), the above (1) to (5) operations are carried out in the reversed order.

As shown in FIG. 3, when the carcass layer is of a double layer structure comprising the carcass plies 8*a* and 8*b*, a first layer carcass ply is produced by controlling the tray 17 in accordance with the above (1) to (5) operations, and the tray 17 is controlled such that a second layer carcass ply moves in a direction opposite from the above (1) to (5) operations. The moving speed of the supply head 19 is constant in both forward and backward movements.

If a carcass ply corresponding to one tire is produced on the tray 17, the cord 10*a* is cut, a new tray 17 is placed, the same operations are carried out, thereby producing a next carcass ply. By repeating this procedure, the necessary number of carcass plies are produced. The carcass plies produced on the tray 17 are supplied to a forming machine one by one, thereby producing a tire using a known method.

The reinforcing layer 6 is preferably formed by spirally winding one or a small number of cords around the shaped object. Using the cord covered with rubber as in the above manner, the guide of the cord is moved in the widthwise direction while rotating the shaped object, thereby spirally winding the cord. By changing the moving speed of the guide at that time, the number of strikes at the widthwise direction can be changed.

In order to obtain a predetermined tire shape and a predetermined cord angle at each portion, it is preferable to appropriately adjust the cord angle when the carcass plies 8*a* and 8*b* are produced. In the case of a bias tire, a relation between a cord angle in the ply state and a cord angle after the tire is formed can be calculated by the following known relational equation (approximate expression), and this relational equation can also be applied in the present invention. If "Ad" is used as variable and "R" of the corresponding portion is determined, "A" can be obtained.

$$Rd \cos A = R \cos Ad$$

Here, "Rd" represents a radius of a drum, "Ad" represents a cord angle with respect to a circumferential direction on the drum, "R" represents a radius corresponding to a position of the cord after the tire is formed, and "A" represents a cord angle with respect to the circumferential direction after the tire is formed.

Structure of Carcass Ply Producing Apparatus
(Second Embodiment)

Figure 11:
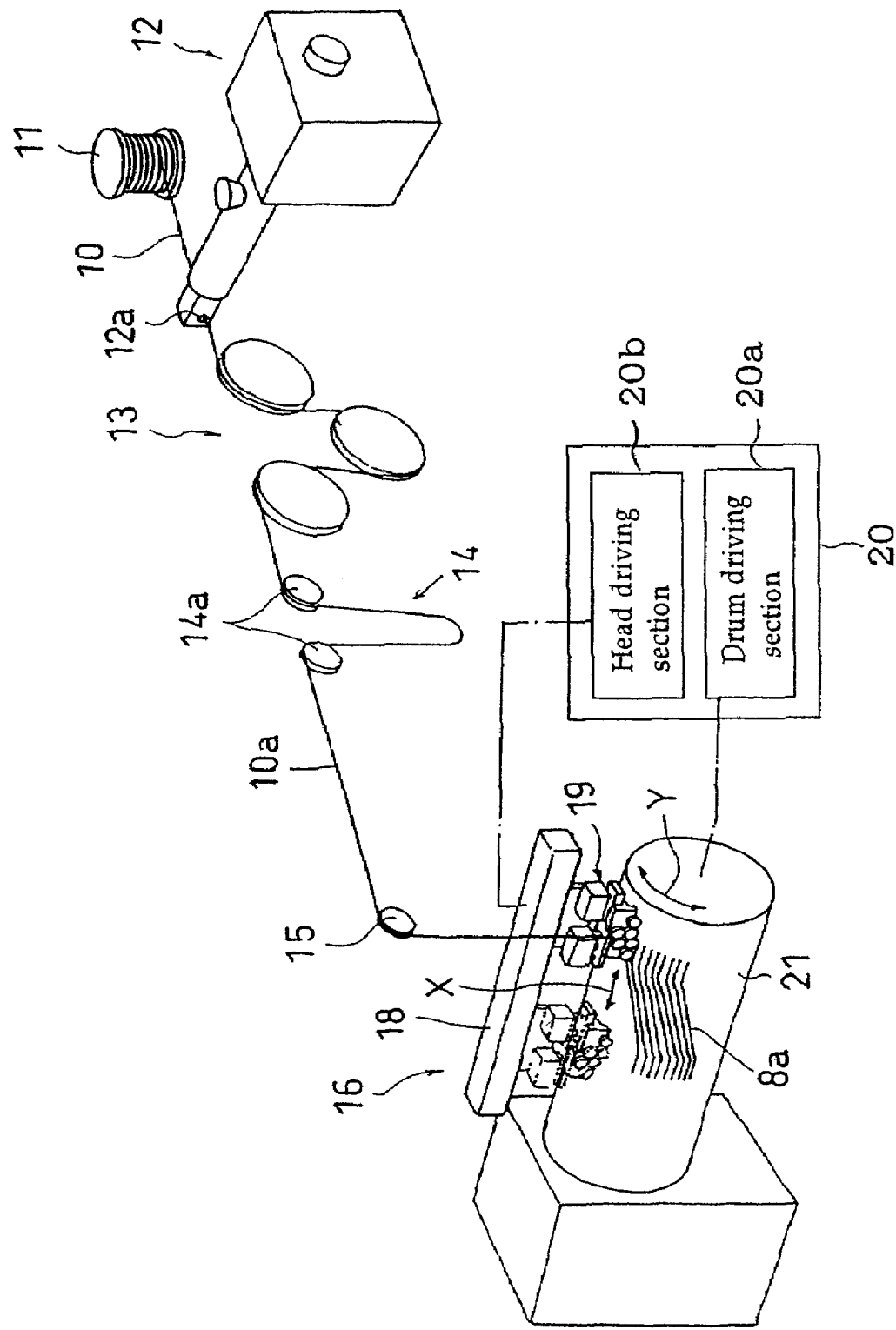
FIG. 11 shows a structure of a carcass ply producing apparatus according to the second embodiment.

A structure of a second embodiment of a carcass ply producing apparatus will be explained with reference to FIG. 11. Members having the same functions as those in the first embodiment are designated with the same numbers, and explanation thereof is omitted.

The second embodiment is different from the first embodiment in that the sticking body comprises a rotation drum 21. An outer peripheral surface of the rotation drum 21 functions as a sticking surface of the cord. The outer peripheral surface is made of rubber or aluminum. When the carcass ply shown in FIG. 3 is produced, control of the rotation drum 21 during the forward movement of the supply head 19 is as follows. The rotation drum 21 is rotated and driven by a motor (not shown) (which corresponds to a sticking body driving mechanism).

(1) right ply end~near tire maximum width: rotation drum is stopped.
(2) near tire maximum width~right shoulder portion: rotation drum moves while gently accelerating.
(3) right shoulder portion~left shoulder portion: rotation drum moves at a constant speed.
(4) left shoulder portion~near tire maximum width: rotation drum moves while gently decelerating.
(5) near tire maximum width~left ply end: rotation drum is stopped.

During the forward movement of the supply head 19, the rotation drum 21 is controlled in the above manner. During a backward movement of the supply head 19, the rotation drum 21 is moved by a distance corresponding to the number of ply cords (in the example in FIG. 9, one ply cord because one cord is supplied), the above (1) to (5) operations are carried out in the reversed order. By repeating this procedure one cycle of the rotation drum 21, the carcass ply can be produced. When the carcass layer is of a double layer structure, it can be produced as in the first embodiment.

Structure of Carcass Ply Producing Apparatus
(Third Embodiment)

Figure 12:
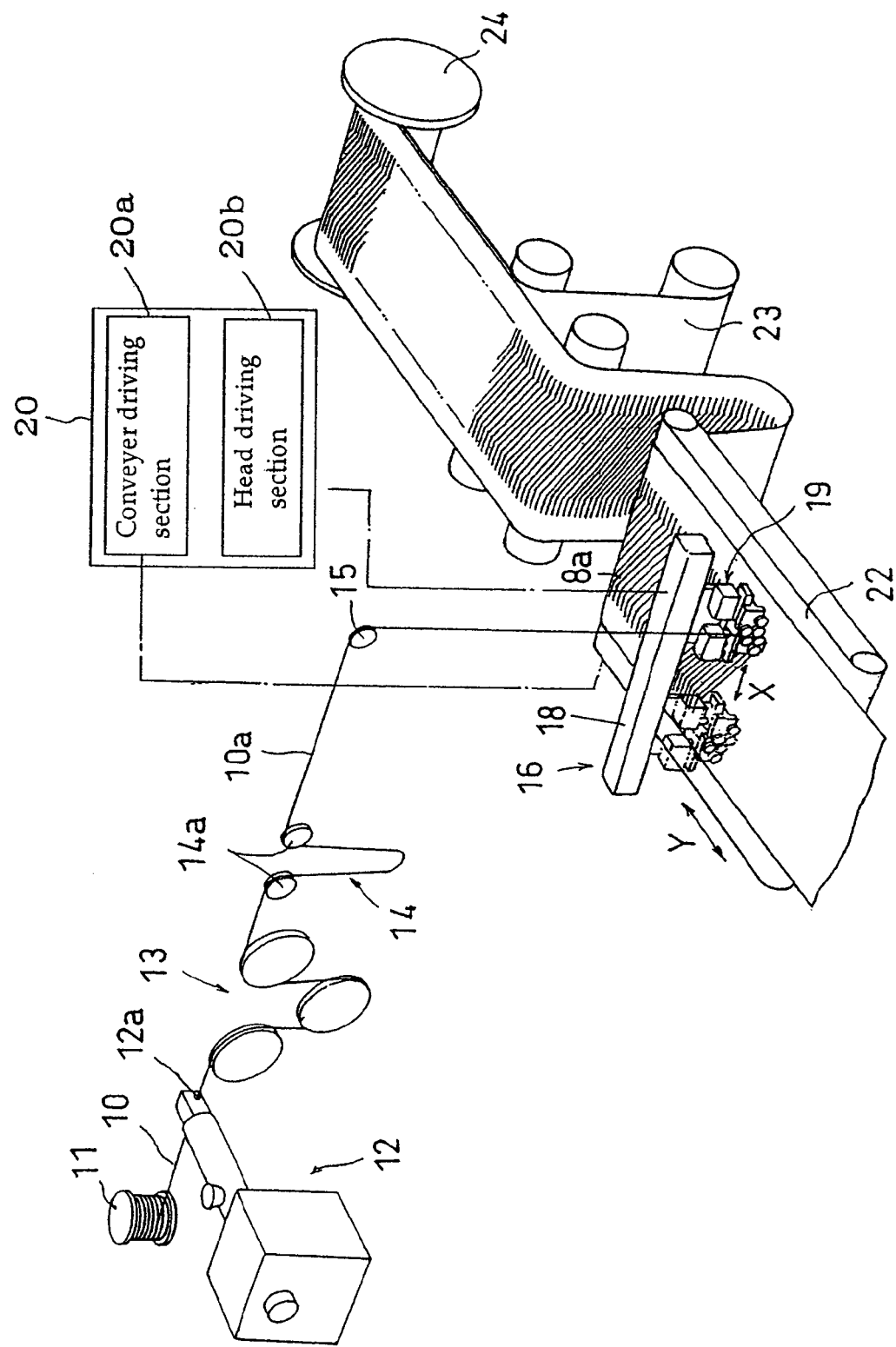
FIG. 12 shows a structure of a carcass ply producing apparatus according to a third embodiment.

A structure of a third embodiment of a carcass ply producing apparatus will be explained with reference to FIG. 12. Members having the same functions as those in the first embodiment are designated with the same numbers, and explanation thereof is omitted.

The third embodiment is different from the first embodiment in that the sticking body comprises a transfer conveyer 22. A transfer surface of the transfer conveyer 22 functions as a sticking surface of the cord. The transfer surface is made of, for example, rubber. When the carcass ply shown in FIG. 3 is produced, control of the transfer conveyer 22 during the forward and backward movements of the supply head 19 is the same as in the case of the first embodiment. The transfer conveyer 22 is driven by a motor (not shown) (which corresponds to a sticking body driving mechanism).

The produced carcass plies are wound around the bobbin 24 together with a cloth 23. When the carcass layer is of the double layer structure, a first layer can be produced in the above manner, and a second layer can be produced by moving the transfer conveyer 22 in the opposite direction from that of the first layer.

Another Embodiment (1) In the present embodiment, one ply cord is supplied, but a plurality of cords may also be supplied.

(2) The producing apparatus of the present invention is suitable for producing the carcass ply shown in FIG. 3 or 6, but the carcass ply to be produced is not limited to one shown in FIG. 3 or 6. It is possible to produce a carcass ply whose disposition angle of the cord is not changed. That is, it is possible to produce various carcass plies.

What is claimed is:

1. A pneumatic tire having two or more carcass layers for reinforcing between a pair of annular beads, wherein
when a region where an angle formed between cords constituting said carcass layers and a circumferential direction of said tire is 90±10° is defined as a radial region, and a region where said cords in upper and lower layers intersect while an angle formed between said cords and the circumferential direction of the tire is 10 to 60° is defined as a bias region,
a region including a position near a tire maximum width includes said radial region, and said bias region is included in any of a region between said radial region and said bead, and a region between said radial region and a tire equator line,
wherein a region having 5 to 30% of height from a lower end with respect to height of carcass of a tire cross section is mainly said bias region, a region of 40 to 65% is mainly said radial region, and a region of 75 to 95% is mainly said bias region.

2. A pneumatic tire having two or more carcass layers for reinforcing between a pair of annular beads, wherein
when a region where an angle formed between cords constituting said carcass layers and a circumferential direction of said tire is 90±10° is defined as a radial region, and a region where said cords in upper and lower layers intersect while an angle formed between said cords and the circumferential direction of the tire is 10 to 60° is defined as a bias region,
a region including a position near a tire maximum width includes said radial region, and said bias region is included in any of a region between said radial region and said bead, and a region between said radial region and a tire equator line,
wherein a region including the tire equator line further includes said radial region reinforced by a belt layer, and said bias region is included in any of intermediate region between that radial region and said radial region near the tire maximum width.

3. The pneumatic tire according to claim 2, wherein a region having 5 to 30% of height from a lower end with respect to height of carcass of a tire cross section is mainly said bias region, a region of 40 to 65% is mainly said radial region, a region of 75 to 95% is mainly said bias region, and a tread is mainly said radial region.

4. A pneumatic tire comprising two or more carcass layers for reinforcing between a pair of annular beads, said pneumatic tire including:
a region including or near a position having a tire maximum width, which region includes a radial region where cords constituting the carcass layers are arranged at an angle of 90±10° with respect to a circumferential direction;
a region between the radial region and one of the beads close thereto, which region includes a bias region where cords in an upper layer and cords in a lower layer constituting the carcass intersect and are both arranged at an angle of 10° to 60° with respect to the circumferential direction; and
a region between the radial region and a tire equator line, which region includes another bias region where cords in an upper layer and cords in a lower layer constituting the carcass intersect and are both arranged at an angle of 10° to 60° with respect to the circumferential direction,
wherein a region including the tire equator line includes another radial region where cords constituting the carcass layers are arranged at an angle of 90±10° with respect to the circumferential direction, said another radial region being reinforced by a belt layer.

5. A pneumatic tire comprising two or more carcass layers for reinforcing between a pair of annular beads, said pneumatic tire including:
a region including or near a position having a tire maximum width, which region includes a radial region where cords constituting the carcass layers are arranged at an angle of 90±10° with respect to a circumferential direction;
a region between the radial region and one of the beads close thereto, which region includes a bias region where cords in an upper layer and cords in a lower layer constituting the carcass intersect and are both arranged at an angle of 10° to 60° with respect to the circumferential direction; and
a region between the radial region and a tire equator line, which region includes another bias region where cords in an upper layer and cords in a lower layer constituting the carcass intersect and are both arranged at an angle of 10° to 60° with respect to the circumferential direction,
wherein a region of 5% to 30% of height of carcass from a lower end of the carcass in a tire cross section is mainly constituted by the bias region, a region of 40% to 65% of the height of carcass from the lower end is mainly constituted by the radial region, and a region of 75% to 95% of the height of carcass from the lower end is mainly constituted by the other bias region.

6. The pneumatic tire according to claim 5, wherein a region including the tire equator line includes another radial region where cords constituting the carcass layers are arranged at an angle of 90±10° with respect to the circumferential direction, said another radial region being reinforced by a belt layer.

* * * * *